US012288418B2

United States Patent
Hasedzic et al.

(10) Patent No.: US 12,288,418 B2
(45) Date of Patent: Apr. 29, 2025

(54) ACTIVITY IDENTIFICATION METHOD AND APPARATUS

(71) Applicant: JAGUAR LAND ROVER LIMITED, Coventry (GB)

(72) Inventors: Elvir Hasedzic, Coventry (GB); Eduardo Dias, Coventry (GB); Ionut Valentin Gheorghe, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 17/609,727

(22) PCT Filed: May 7, 2020

(86) PCT No.: PCT/EP2020/062786
§ 371 (c)(1),
(2) Date: Nov. 8, 2021

(87) PCT Pub. No.: WO2020/225389
PCT Pub. Date: Nov. 12, 2020

(65) Prior Publication Data
US 2022/0230474 A1 Jul. 21, 2022

(30) Foreign Application Priority Data
May 8, 2019 (GB) .................................... 1906449

(51) Int. Cl.
*G06V 40/20* (2022.01)
*G06T 7/246* (2017.01)
(Continued)

(52) U.S. Cl.
CPC .............. *G06V 40/20* (2022.01); *G06T 7/251* (2017.01); *G06V 10/82* (2022.01); *G06V 20/597* (2022.01);
(Continued)

(58) Field of Classification Search
CPC ...... G06V 40/20; G06V 10/82; G06V 20/597; G06V 20/60; G06V 40/23; G06V 10/34;
(Continued)

(56) References Cited

U.S. PATENT DOCUMENTS 9,785,247 B1 * 10/2017 Horowitz ............. H04N 13/296
10,653,957 B2 * 5/2020 Cossairt .................. G06F 3/011
(Continued)

FOREIGN PATENT DOCUMENTS

CN 106971131 A 7/2017
EP 2486545 A2 8/2012
(Continued)

OTHER PUBLICATIONS

Rahmani et al, ("Learning Action Recognition Model From Depth and Skeleton Videos", 2017 IEEE International Conference on Computer Vision, PP5833-5842) (Year: 2017).*
(Continued)

*Primary Examiner* — Amara Abdi
(74) *Attorney, Agent, or Firm* — Reising Ethington P.C.

(57) ABSTRACT

Aspects of the present invention relate to a control system (1) for identifying at least a first activity performed by a person of interest (POI-n). The control system (1) includes a controller having a processor (20) and a system memory (26). The controller (13) is configured to receive image data (DIMG1, DIMG2) from at least one imaging device (C1, C2). The image data (DIMG1, DIMG2) includes at least one image frame representing an image scene including at least a portion of a person of interest (POI-n). The image data (DIMG1, DIMG2) is analysed to identify a skeletal model (15) of the at least a portion of the person of interest (POI-n); and at least one object of interest (OOI-n) with which the person of interest (POI-n) is interacting. The first activity being performed by the person of interest (POI-n) is iden-
(Continued)

tified in dependence on the skeletal model (15) and the identified object of interest (OOI-n). The present invention relates to a related method of identifying an activity being performed by a person of interest (POI-n). The present invention also relates to computer software and a non-transitory, computer-readable storage medium storing instructions thereon.

20 Claims, 8 Drawing Sheets

(51) Int. Cl.
  *G06V 10/82*   (2022.01)
  *G06V 20/59*   (2022.01)
  *G06V 20/60*   (2022.01)
  *G06V 10/34*   (2022.01)
(52) U.S. Cl.
  CPC ............ *G06V 20/60* (2022.01); *G06V 40/23* (2022.01); *G06T 2207/10016* (2013.01); *G06T 2207/30196* (2013.01); *G06T 2207/30268* (2013.01); *G06V 10/34* (2022.01)
(58) Field of Classification Search
  CPC ...... G06V 20/40; G06V 40/11; G06V 40/113; G06T 7/251; G06T 2207/10016; G06T 2207/30196; G06T 2207/30268; G06T 7/75; G06T 2200/08; G06T 2207/10004; G06T 2207/30201; G06T 2207/30248; G06T 2210/61; G06F 18/24133
  See application file for complete search history.

(56) References Cited

U.S. PATENT DOCUMENTS

| 10,943,136 B1* | 3/2021 | Chan ...................... G06V 10/34 |
| 2007/0253040 A1* | 11/2007 | Lee ........................ H04N 1/403 |
| | | 358/518 |
| 2010/0277489 A1 | 11/2010 | Geisner et al. |
| 2011/0080336 A1 | 4/2011 | Leyvand et al. |
| 2016/0046298 A1 | 2/2016 | DeRuyck et al. |
| 2016/0267335 A1 | 9/2016 | Hampiholi |
| 2017/0139471 A1* | 5/2017 | Bury ...................... G06F 1/3231 |
| 2018/0232563 A1* | 8/2018 | Albadawi ................ G06T 7/70 |
| 2019/0188505 A1 | 6/2019 | Madkor et al. |
| 2019/0213406 A1 | 7/2019 | Porikli et al. |
| 2019/0286892 A1* | 9/2019 | Li ............................ G06T 7/70 |
| 2020/0012872 A1 | 1/2020 | Autran ................ B60W 50/082 |
| 2020/0019784 A1* | 1/2020 | Sun ........................ G06V 20/30 |
| 2020/0033937 A1* | 1/2020 | Erivantcev .............. G06T 7/246 |
| 2020/0207358 A1* | 7/2020 | Katz .................. G02B 27/0093 |
| 2020/0242345 A1* | 7/2020 | Huang .................. G06V 10/44 |
| 2021/0009150 A1* | 1/2021 | Chen .................... B60W 50/14 |
| 2021/0241011 A1 | 8/2021 | Cronje et al. |
| 2021/0307621 A1* | 10/2021 | Svenson ................ A61B 5/015 |
| 2022/0114817 A1* | 4/2022 | Gronau .................. G06V 40/10 |

FOREIGN PATENT DOCUMENTS

| WO | 2016191051 A1 | 12/2016 |
| WO | 2018033852 A1 | 2/2018 |
| WO | 2018218286 A1 | 12/2018 |

OTHER PUBLICATIONS

International Search Report corresponding to International Application No. PCT/EP2020/062786, dated Aug. 10, 2020, 4 pages.
Written Opinion corresponding to International Application No. PCT/EP2020/062786, dated Aug. 10, 2020, 4 pages.
Combined Search and Examination Report corresponding to Application No. GB GB 1906449.2, dated Oct. 16, 2019.
European Office Action corresponding to application EP20725683.5, dated Jan. 11, 2024, 5 pages.

* cited by examiner

ACTIVITY IDENTIFICATION METHOD AND APPARATUS

TECHNICAL FIELD

The present disclosure relates to activity identification method and apparatus. Aspects of the invention relate to a control system, a vehicle, a method, computer software and a non-transitory, computer-readable storage medium.

BACKGROUND

It is known to process image data to track head pose and gaze direction. These techniques have application in a vehicle, for example to monitor an occupant of the vehicle. It is known to use occupant detection to control airbag deployment in a vehicle. However, there are certain limitations with these techniques, for example in identifying or recognising interactions with objects and the like disposed in the vehicle.

It is an aim of the present invention to address one or more of the disadvantages associated with the prior art.

SUMMARY OF THE INVENTION

Aspects and embodiments of the invention provide a control system, a vehicle, a method, computer software and a non-transitory, computer-readable storage medium as claimed in the appended claims.

According to an aspect of the present invention there is provided a control system for identifying at least a first activity performed by a person of interest, the control system comprising a controller having a processor and a system memory, the controller being configured to:
 receive image data from at least one imaging device, the image data comprising at least one image frame representing an image scene including at least a portion of a person of interest;
 analyse the image data to identify a skeletal model of the at least a portion of the person of interest;
 analyse the image data to identify at least one object of interest with which the person of interest is interacting; and
 identify the first activity performed by the person of interest in dependence on the skeletal model and the identified object of interest. The control system uses both the skeletal model and the at least one object of interest to identify the first activity being performed by the person of interest. The controller may, for example, identify the activity in dependence on a detected interaction between the skeletal model and the identified object of interest. At least in certain embodiments, the use of both data sets can provide improved accuracy in the identification of the first activity.

The controller may, for example, be operable to differentiate between different activities performed by the person of interest. For example, the controller may differentiate between first and second activities which are different from each other. A plurality of activities may be predefined. The controller may be configured to identify the first activity from the plurality of predefined activities. The activities may be defined through analysis of sample image data, for example captured in a system training process. The definition of the activities may be calibrated for a particular user.

Identifying the first activity may comprise recognising (or otherwise classifying) one or more actions performed by the person of interest. The one or more actions (alone, in combination or in a predetermined sequence) may be performed by the person of interest as part of the first activity. By recognising the or each action, the controller can identify the first activity. Each action may, for example, comprise or consist of a movement pattern.

The controller may identify a skeletal pose of the skeletal model. The skeletal pose may define the location and/or orientation of each skeletal element making up the skeletal model. The controller may be configured to identify the first activity in dependence on the skeletal pose and the identified object of interest. Alternatively, or in addition, the controller may be configured to identify movement of at least a portion of the skeletal model; and/or to identify movement of the identified object of interest. The controller may be configured to identify the first activity in dependence on the movement of the skeletal model; and/or the movement of the identified object of interest.

The controller may be configured to identify the first activity in dependence on a manipulation of the identified object of interest by the person of interest. The controller may track the movement and/or the orientation of the identified object of interest. The movement and/or the orientation of the identified object of interest may be monitored in conjunction with the skeletal pose and/or movement of the skeletal model.

The controller may be configured to identify the first activity by identifying a predetermined first movement pattern of the skeletal model and/or the identified object of interest.

The image data may comprise a plurality of image frames. The controller may be configured to identify the skeletal model and/or the at least one object of interest in each of the plurality of image frames and to identify movement of the skeletal model and/or the at least one object of interest across the plurality of image frames.

The controller may be configured to identify the at least one object of interest as being a particular type of object of interest. For example, the controller may identify the at least one object of interest as being one or more of the following: a food item, a beverage container, a book, a personal computer (such as laptop), a cellular telephone, etc.

According to a further aspect of the present invention there is provided a control system for identifying at least a first activity performed by a person of interest in a vehicle, the control system comprising a controller having a processor and a system memory, the controller being configured to:
 receive image data from at least one imaging device, the image data comprising a plurality of image frames representing an image scene including a person of interest;
 analyse the image data to identify a skeletal model of the person of interest in each of the plurality of image frames;
 identify movement of at least a portion of the skeletal model across the plurality of image frames; and
 identify the first activity performed by the person of interest in dependence on the identified movement. The controller may, for example, be operable to differentiate between activities performed by the person of interest. The person of interest may be a driver of the vehicle or a passenger in the vehicle.

The skeletal model may comprise at least one skeletal element. The controller may be configured to generate a motion vector in respect of one or more of the skeletal elements in order to track the movement of the skeletal model.

The controller may be configured to determine an attentiveness indicator in dependence on the skeletal model, the attentiveness indicator providing an indication of the attentiveness of the person of interest when performing the first activity. An attentiveness threshold could be applied to indicate when the person of interest is not attentive.

The first activity may comprise controlling dynamic operation of a vehicle. The controller being configured to determine if the person of interest is engaged in performing the first activity. The controller may be configured to determine if the person of interest is performing a second activity which is different from the first activity.

The controller may be configured to identify a plurality of body landmarks in each image frame. The body landmarks may be used to identify the skeletal model.

The controller may implement a machine learning algorithm, such as a neural network, to identify the first activity. The neural network may be based on one or more convolution operation (CNN), each convolution operation comprising one or more convolution filters The neural network may comprise a long short term memory (LSTM) network. The LSTM neural network may comprise one or more LSTM cells.

According to a further aspect of the present invention there is provided a vehicle comprising the control system described herein.

According to a further aspect of the present invention there is provided a method of identifying at least a first activity performed by a person of interest, the method comprising:
  receiving image data comprising at least one image frame representing an image scene including at least a portion of a person of interest;
  analysing the image data to identify a skeletal model of the at least a portion of the person of interest;
  analysing the image data to identify at least one object of interest with which the person of interest is interacting; and
  identifying the first activity performed by the person of interest in dependence on the skeletal model and the identified object of interest.

The method may comprise identifying movement of at least a portion of the skeletal model; and/or identifying movement of the identified object of interest.

The method may comprise identifying the first activity in dependence on the movement of the skeletal model and/or the at least one object of interest.

The method may comprise identifying the first activity by identifying a predetermined first movement pattern of the skeletal model and/or the at least one object of interest.

The image data may comprise a plurality of image frames. The image frames are temporally offset from each other. The method may comprise identifying the skeletal model and/or the at least one object of interest in each of the plurality of image frames and identifying movement of the skeletal model and/or the at least one object of interest across the plurality of image frames.

According to a still further aspect of the present invention there is provided a method of identifying at least a first activity performed by a person of interest in a vehicle, the method comprising:
  receiving image data comprising a plurality of image frames representing an image scene including a person of interest;
  analysing the image data to identify a skeletal model of the person of interest in each of the plurality of image frames;
  identifying movement of at least a portion of the skeletal model across the plurality of image frames; and
  identifying the first activity performed by the person of interest in dependence on the identified movement.

The skeletal model may comprise at least one skeletal element. The method may comprise monitoring movement of the or each skeletal element in order to identify the movement of the skeletal model.

The method may comprise determining an attentiveness indicator in dependence on the movement of at least a portion of the skeletal model. The attentiveness indicator may provide an indication of the attentiveness of the person of interest when performing the first activity.

The method may comprise identifying a plurality of body landmarks in each image frame and using the body landmarks to identify the skeletal model.

According to a further aspect of the present invention there is provided computer software that, when executed, is arranged to perform a method described herein.

According to a further aspect of the present invention there is provided a non-transitory, computer-readable storage medium storing instructions thereon that, when executed by one or more electronic processors, causes the one or more electronic processors to carry out the method described herein.

Aspects of the present invention relate to the identification of an activity performed by a person of interest. The activity may be identified as being a particular activity, for example the activity may be identified as being one of a plurality of activities (which may be predefined). Aspects of the present invention may be understood as "recognising" an activity performed by the person of interest. The terms "identify" and "recognise" (And derivatives thereof) used herein in relation to the performance of an activity are interchangeable. Each activity may comprise one or more actions performed by the person of interest. The or each action may comprise a movement or gesture.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

An activity identification system 1 for identifying (or recognising) an activity performed by a person of interest POI-n in accordance with an embodiment of the present invention will now be described with reference to the accompanying Figures.

Figure 1:
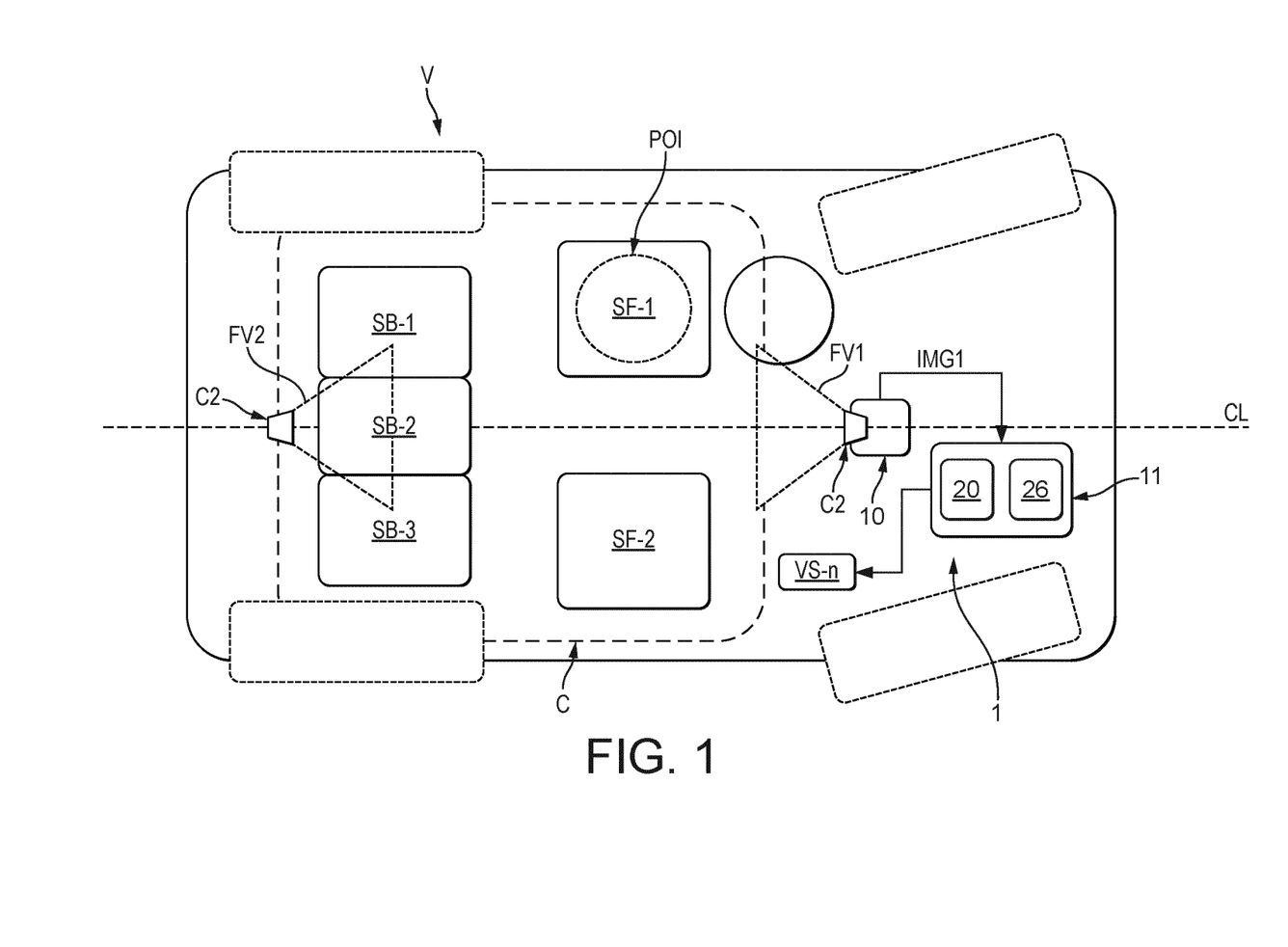
FIG. 1 shows a schematic representation of a vehicle incorporating an activity identification system in accordance with an embodiment of the present invention.

The activity identification system 1 in the present embodiment is provided in a vehicle V, such as an automobile. A schematic representation of the vehicle V is shown in FIG. 1. Other applications for the activity identification system 1 are also contemplated. The person of interest POI-n in the present embodiment is an occupant of the vehicle V. The vehicle V comprises a cabin C for one or more occupants. Any occupant in the cabin C may be classed as a person of interest POI-n by the activity identification system 1 in accordance with the present embodiment. The person of interest POI-n may be a driver of the vehicle V. Alternatively, or in addition, the person of interest POI-n may be a passenger in the vehicle.

The cabin C in the present embodiment comprises a front row R-1 comprising first and second front seats SF-1, SF-2; and a back-row R-2 comprising first, second and third back seats SB-1, SB-2, SB-3. The first front seat SF-1 is a driver seat for seating a driver of the vehicle; and the second front seat SF-2 is a passenger seat for seating a passenger. The first, second and third back seats SB-1, SB-2, SB-3 are suitable for additional passengers. The driver seat is illustrated on the right-hand side of the cabin C, but it will be understood that the invention can be applied in left- and right-hand drive iterations of the vehicle V. In a modified arrangement, the back-row R-2 may be consist of first and second back seats SB-1, SB-2. The activity identification system 1 may be used in a vehicle V having a single row of seats, for example consisting of first and second front seats SF-1, SF-2. The activity identification system 1 may be used in a vehicle V having more than two rows of seats, for example a third row which may comprise one or more occasional or temporary seats.

The activity identification system 1 is configured to differentiate between a plurality of different activities performed by the person of interest POI-n. The activity identification system 1 may identify an activity being performed by the person of interest POI-n as one of the plurality of different activities. Each activity may be predefined, for example by defining one or more separate actions performed as part of that activity. The activity identification system 1 may identify a particular activity by recognising the performance of a plurality of actions in a predefined sequence. One or more variations of each activity may be predefined, for example to differentiate between the person of interest POI-n using their left hand or their right hand to perform the same activity.

Figure 2:
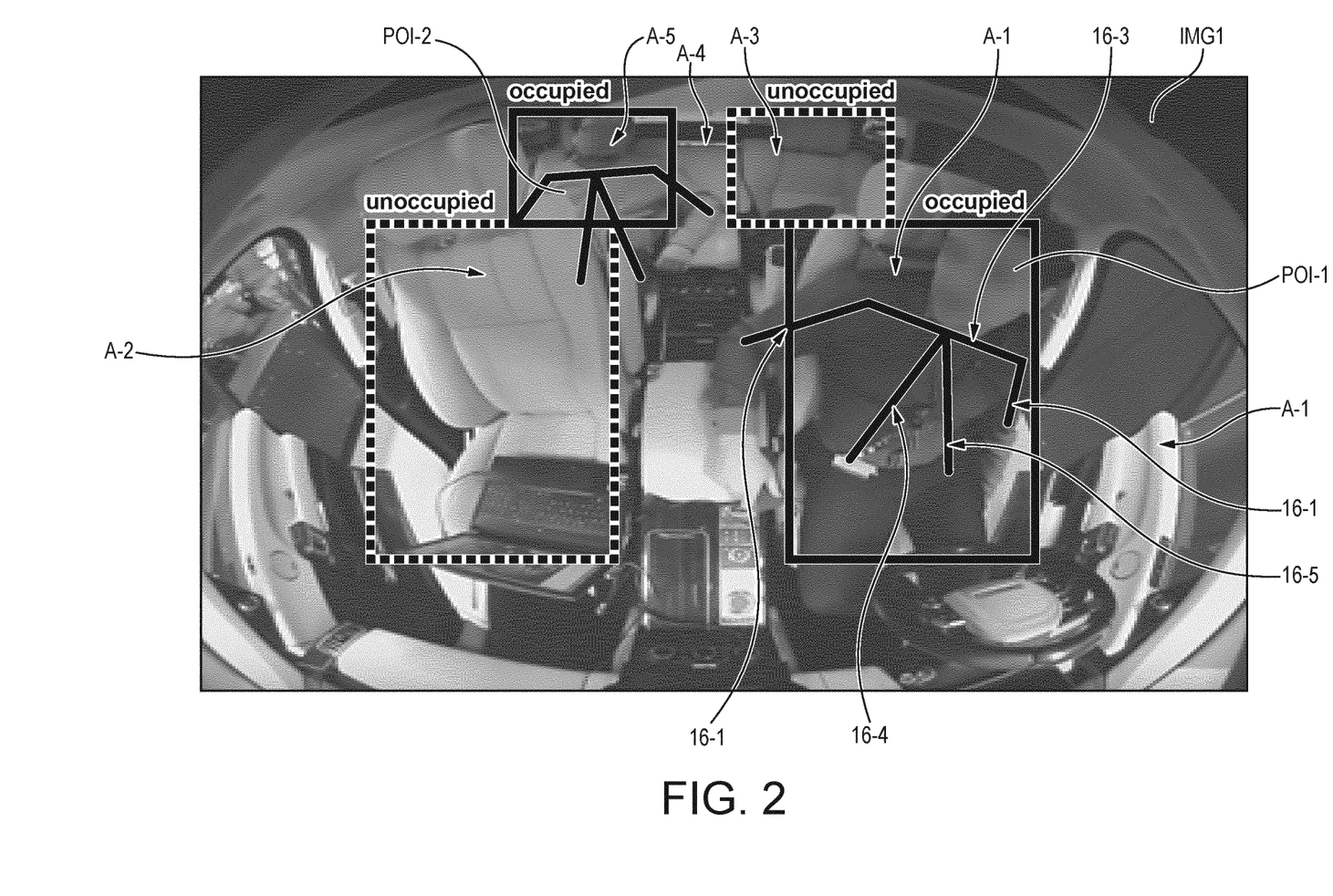
FIG. 2 shows a first image captured by a first imaging device with areas of interest and skeletal models of the person(s) of interest overlaid.
Figure 3:
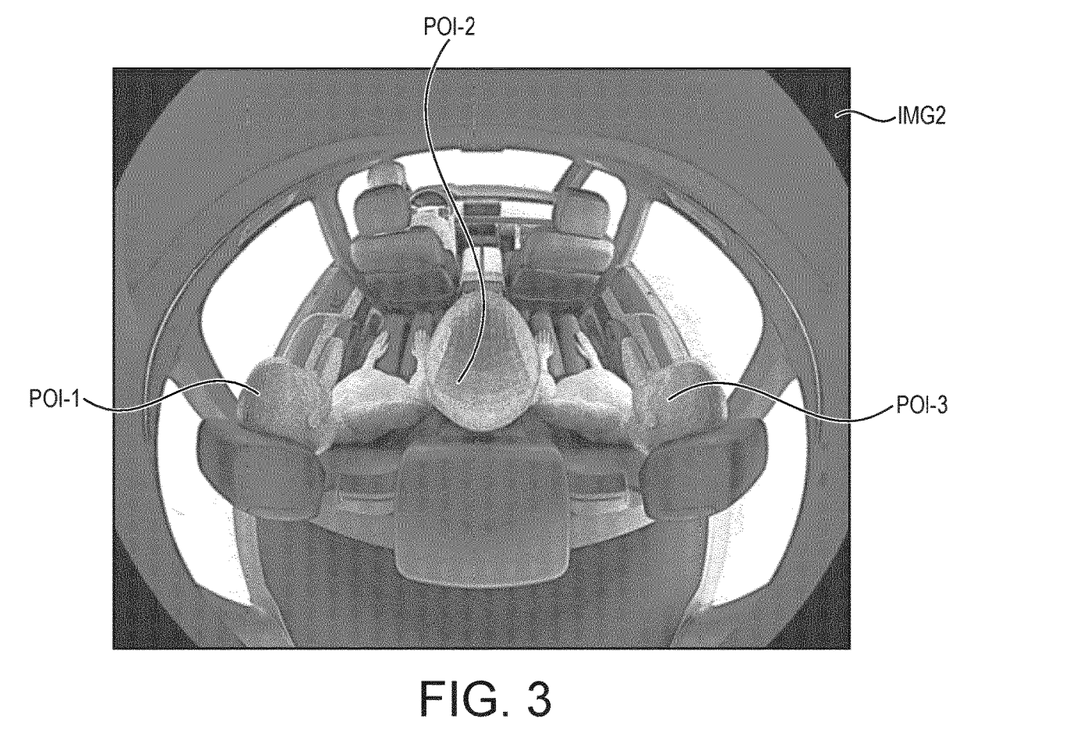
FIG. 3 shows a second image captured by a second imaging device.

The activity identification system 1 comprises a sensor unit 10 and a control system 11. The cabin sensor unit 10 comprises at least one imaging device Cn having a field of view FVn. In the present embodiment the cabin sensor unit 10 comprises a first imaging device C1 having a first field of view FV1; and a second imaging device C2 having a second field of view FV2. The first imaging device C1 is operable to generate first image data DIMG1 representing a first image IMG1 of a scene within the cabin C. The first imaging device C1 in the present embodiment is a video camera operable to generate first image data DIMG1 which is updated a plurality of times per second (corresponding to image "frames"). The first imaging device C1 is mounted at the front of the cabin C and has a rearward-facing orientation. A first image IMG1 captured by the first imaging device C1 is shown in FIG. 2 by way of example. The second imaging device C2 is operable to generate second image data DIMG2 representing a second image IMG2 of a scene within the cabin C. The second imaging device C2 in the present embodiment is a video camera operable to generate second image data DIMG2 which is updated a plurality of times per second (corresponding to image "frames"). The second imaging device C2 is mounted at the rear of the cabin C and has a forward-facing orientation. A second image IMG2 captured by the second imaging device C2 is shown in FIG. 3 by way of example. The first imaging device C1 and the second imaging device C2 are oriented such that, in use, the first field of view FV1 and/or the second field of view FV2 encompass at least a portion of each person of interest POI-n seated in one or more of the first and second front seats SF-1, SF-2 and/or one or more of the first, second and third back seats SB-1, SB-2, SB-3. The first imaging device C1 in the present embodiment is mounted centrally in an upper region of the cabin C to provide an improved line of sight of a person of interest POI-n sitting in one or more of the first, second and third back seats SB-1, SB-2, SB-3. The first imaging device C1 could, for example, be mounted to a rear-view mirror, a roof of the cabin C, or a dashboard (not shown). The second imaging device C2 may be mounted internally to a roof of the vehicle V, for example in the headlining.

The cabin sensor unit 10 could comprise a single imaging device C1, or more than two (2) imaging devices C1, C2. A separate first imaging device C1 could be associated with each row of seats in the cabin C or with each seat in the cabin C. By way of example, first and second imaging devices C1, C2 could be associated with the front row R-1 and the back-row R-2 respectively. The first imaging device C1 in the present embodiment comprises a RGB imager with a band pass filter allowing transmission of visible light with a cut-off limit just above the near-infrared light spectrum. This filter coupled with active near-infrared light allows for the system to receive information from the first imaging device C1 and/or the second imaging device C2 in a range of ambient light conditions, including very low ambient light conditions. Other types and configurations of imaging devices 12 may be used.

Figure 4:
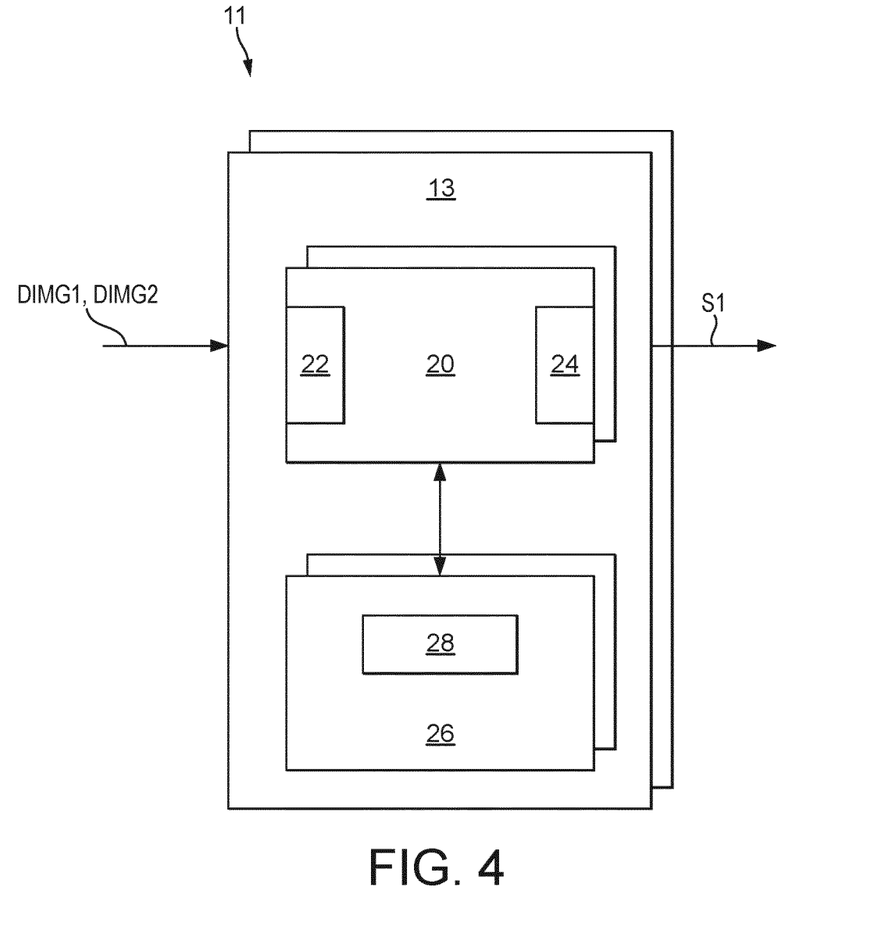
FIG. 4 shows a schematic representation of the control system of the activity identification system shown in FIG. 1.
Figure 5:
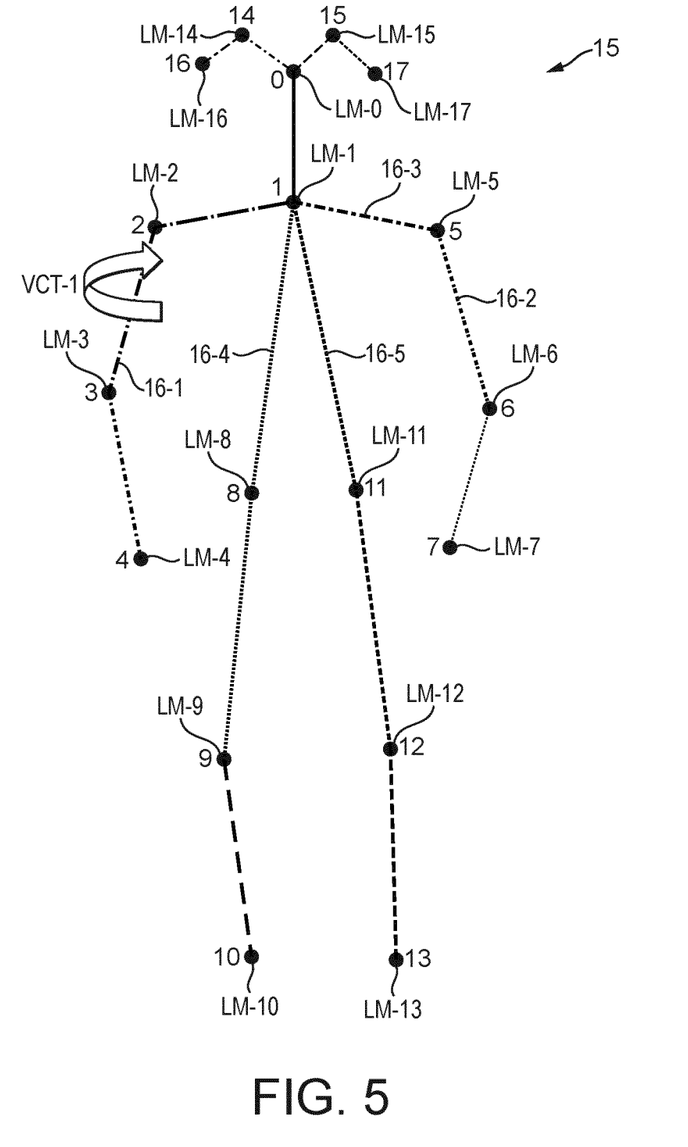
FIG. 5 shows a skeletal model for use by the activity identification system.

With reference to FIG. 4, there is illustrated a simplified example of the control system 11 such as may be adapted to implement the method described herein to identify at least a first activity performed by a person of interest. The control system 11 comprises one or more controllers 13 and is configured to receive The first image data DIMG1 and/or the second image data DIMG2 from the first imaging device C1. The first image data DIMG1 and/or the second image data DIMG2 includes at least one image frame representing an image scene including at least a portion of the person of interest POI-n. The one or more controllers 13 analyse The first image data DIMG1 and/or the second image data DIMG2 to generate a skeletal model 15 (shown in FIG. 5)

representing at least a portion of the person of interest POI-n. The controller 13 also analyses The first image data DIMG1 and/or the second image data DIMG2 to identify one or more objects of interest OOI-n. The object of interest OOI-n may, for example, be an object with which the person of interest POI-n is interacting. The controller 13 identifies the first activity performed by the person of interest POI-n in dependence on the skeletal model 15 in combination with any objects of interest OOI-n identified within the first image data DIMG1 and/or the second image data DIMG2.

The analysis of The first image data DIMG1 and/or the second image data DIMG2 can be performed in respect of a single frame of image data. Alternatively, or in addition, the analysis may be performed in respect of a plurality of frames. The analysis may, for example, comprise an optical flow analysis to identify movement of the person of interest POI-n and/or an object of interest OOI-n. Optical flow comprises a pixel matching (i.e. correspondence estimation) technique applied between consecutive image frames in time. Optical flow can also be applied to three-dimensional (3D) point clouds acquired via ranging sensors (e.g. RGB-D), to work out correspondence between voxels. Knowing where the same pixel/voxel appears in the next frame can be used to infer motion direction and magnitude.

It is to be understood that the, or each controller 13 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 13 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 13 to implement the control techniques described herein (including some or all of the functionality required for the method described herein). The set of instructions could be embedded in said one or more electronic processors of the controller 13; or alternatively, the set of instructions could be provided as software to be executed in the controller 13. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 4, the or each controller 13 comprises at least one electronic processor 20 having one or more electrical input(s) 22 for receiving one or more input signal(s) comprising The first image data DIMG1 and/or the second image data DIMG2, and one or more electrical output(s) 24 for outputting one or more output signal(s). The or each controller 13 further comprises at least one memory device 26 electrically coupled to the at least one electronic processor 20 and having instructions 28 stored therein. The at least one electronic processor 20 is configured to access the at least one memory device 26 and execute the instructions 28 thereon so as to perform the method(s) described herein.

The, or each, electronic processor 20 may comprise any suitable electronic processor (e.g., a microprocessor, a microcontroller, an ASIC, etc.) that is configured to execute electronic instructions. The, or each, electronic memory device 26 may comprise any suitable memory device and may store a variety of data, information, threshold value(s), lookup tables or other data structures, and/or instructions therein or thereon. In an embodiment, the memory device 26 has information and instructions for software, firmware, programs, algorithms, scripts, applications, etc. stored therein or thereon that may govern all or part of the methodology described herein. The processor, or each, electronic processor 20 may access the memory device 26 and execute and/or use that or those instructions and information to carry out or perform some or all of the functionality and methodology describe herein.

The at least one memory device 26 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 13 have been described comprising at least one electronic processor 20 configured to execute electronic instructions stored within at least one memory device 26, which when executed causes the electronic processor(s) 20 to carry out the method as herein described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

The controller 13 implements a body landmark recognition algorithm as a pre-processing step. The body landmark recognition algorithm processes. The first image data DIMG1 and the second image data DIMG2 generated by the first imaging device C1 and the second imaging device C2 to identify a plurality of body landmarks LM-n of the person of interest POI-n. The body landmarks LM-n are identified for each person of interest POI-n present in the cabin C. The body landmarks LM-n are used to generate a skeletal model 15 providing a virtual representation of the or each person of interest POI-n identified in the cabin C. The skeletal model 15 comprises a plurality of skeletal elements 16-n.

As shown in FIG. 5, the body landmarks of a person of interest POI-n may comprise one or more of the following: a nose landmark LM-0, a chest landmark LM-1, a right shoulder landmark LM-2, a right elbow landmark LM-3, a right wrist landmark LM-4, a left shoulder landmark LM-5, a left elbow landmark LM-6, a left wrist landmark LM-7, a right hip landmark LM-8, a right knee landmark LM-9, a right ankle landmark LM-10, a left hip landmark LM-11, a left knee landmark LM-12, a left ankle landmark LM-13, a right eye landmark LM-14, a left eye landmark LM-15, a right ear landmark LM-16, and a left ear landmark LM-17. The first field of view FV1 of the first imaging device C1 may be partially occluded by features in the cabin C (or other occupants) and, as a result, The first image data DIMG1 and/or the second image data DIMG2 may comprise an incomplete representation of one or more occupants. For example, the first and second front seats SF-1, SF-2 may partially occlude a person of interest POI-n seated in one of the first, second and third back seats SB-1, SB-2, SB-3. In respect of each person of interest POI-n, the body landmark recognition algorithm is configured to generate the skeletal model 15 in dependence on the identified body landmarks. In the present embodiment, the skeletal model consists of the following body landmarks: the chest landmark LM-1; the right and left shoulders landmarks LM-2, LM-5; the right and left elbows landmark LM-3, LM-6; and the right and left hip landmark LM-8, LM-11. The skeletal model 15 could be modified to incorporate additional body landmarks LM-n, such as the right and left knees landmark LM-9, landmark LM-12 and/or the nose landmark LM-0. A variety of visual body landmark detection algorithms are available for commercial applications. A suitable body landmark recognition algorithm is the OpenPose algorithm.

As illustrated in FIG. 2, a plurality of areas of interest A-n are defined within the first image data DIMG1. The areas of interest A-n each comprise a discrete region which does not overlap with any of the other areas of interest A-n. In the present embodiment, the areas of interest A-n are rectangular. The areas of interest A-n may have other polygonal shapes. Each area of interest A-n is associated with one of the seats in the cabin C. In the present embodiment, the first and second areas of interest A-1, A-2 are associated with the first and second front seats SF-1, SF-2 respectively; and the third, fourth and fifth areas of interest A-3, A-4, A-5 are associated with the first, second and third back seats SB-1, SB-2, SB-3 respectively. It will be understood that areas of interest A-n may be defined for additional seats provided in the cabin C, for example seats in a third row or occasional seats which can be stowed when not in use. The areas of interest A-n associated with the first, second and third back seats SB-1, SB-2, SB-3 are smaller than those associated with the first and second front seats SF-1, SF-2 to reflect the relative proximity to the first imaging device C1. The size and/or location of the areas of interest A-n could be modified dynamically. An area of interest A-n may be increased in size in dependence on a determination that an adjacent seat is unoccupied; and/or may be reduced in size in dependence on a determination that an adjacent seat is occupied. By predefining the areas of interest A-n within the scene, the potential for false identification of a person of interest POI-n may be reduced. For example, the likelihood of a person visible through a side window or a rear windshield being identified as a person of interest POI-n may be reduced. The controller 3 may crop the raw pixels from the first image data DIMG1 and/or the second image data DIMG2 in the or each area of interest A-n to generate a subset of The first image data DIMG1 and/or the second image data DIMG2.

The body landmark recognition algorithm uses the areas of interest A-n to identify one or more body landmarks LM-n relating to a person of interest POI-n seated in one of the seats within the cabin C. The controller 13 can thereby process the first image data DIMG1 and/or the second image data DIMG2 to determine if each seat in the cabin C is occupied or vacant. The controller 13 uses at least one of the body landmarks LM-n as at least one reference body landmark LM-n for this determination. In the present embodiment, the chest landmark LM-1 is used as the reference body landmark LM-n. The controller 13 analyses The first image data DIMG1 and/or the second image data DIMG2 to identify one or more chest landmarks LM-1. The controller 13 compares the location of the or each identified chest landmark LM-1 to the areas of interest A-n. If the controller 13 identifies a chest landmark LM-1 located within a predefined area of interest A-n, the seat associated with that area of interest A-n is flagged as being occupied. If the controller 13 is unable to identify a chest landmark LM-1 located within a predefined areas of interest A-n, the seat associated with that area of interest A-n is flagged as being unoccupied. The controller 13 may thereby determine whether each seat is occupied or unoccupied.

The body landmark recognition algorithm links the body landmarks LM-n associated with the identified chest landmark(s) LM-1 to form the skeletal model 15 for each person of interest POI-n. The skeletal model 15 represents a virtual model of the person of interest POI-n. The skeletal model 15 comprises a plurality of skeletal elements 16-n each defined by at least one body landmark LM-n. In the present embodiment, each of the skeletal elements 16-n is defined by a pair of the body landmarks LM-n. The body landmark recognition algorithm is configured to identify pairs of the body landmarks LM-n defining each of the skeletal elements 16-n which collectively form the skeletal model 15. In the present embodiment, the skeletal model 15 is composed of five (5) skeletal element 16-n, as illustrated in FIG. 2 for a driver of the vehicle V. The right shoulder landmark LM-2 and the right elbow landmark LM-3 form a first skeletal element 16-1 corresponding to an upper (right) arm of the person of interest POI-n. The left shoulder landmark LM-5 and the left elbow landmark LM-6 form a second skeletal elements 16-2 corresponding to an upper (left) arm of the person of interest POI-n. The right shoulder landmark LM-2 and the left shoulder landmark LM-5 form a third skeletal element 16-3. The chest landmark LM-1 and the right hip landmark LM-8 form a fourth skeletal element 16-4; and the chest landmark LM-1 and the left hip landmark LM-11 form a fifth skeletal elements 16-5. The skeletal model 15 comprises skeletal pose data which defines the relative position and orientation of each identified skeletal element 16-n.

The first image data DIMG1 and/or the second image data DIMG2 may be analysed with respect to time and a motion vector VCT-n (illustrated in FIG. 5) generated for each skeletal element 16-n forming the skeletal model 15. The resulting motion vectors VCT-n each represent a direction and a speed of movement. The motion vector VCT-n for each skeletal element 16-n is compiled over a period of time to generate a movement pattern representing changes in the position and/or orientation of that skeletal element 16-n. The movement patterns for each skeletal element 16-n is used to generate a skeletal movement pattern representing movement of at least a portion of the skeletal model 15. The generated skeletal movement pattern may be stored as skeletal movement data.

The controller 13 is configured to compare the skeletal movement data with a plurality of predefined sets of activity data. Each set of activity data defines one or more movement patterns or actions associated with the performance of a particular activity. The sets of activity data may each define movement of part or all of the skeletal model 15 while a particular activity is performed. A plurality of different sets of activity data may be defined, the sets of activity data each corresponding to a different activity. For example, a first set of activity data may define a first activity; and a second set of activity data may define a second activity (which is different from the first activity). The sets of activity data may, for example, define one or more of the following activities: the person of interest POI-n is sleeping; the person of interest POI-n consuming an item of food or a beverage; the person of interest POI-n is looking over their shoulder, for example to visually check for an object (such as an obstacle, a pedestrian, a cyclist or another vehicle) behind or to a side of the vehicle V; the person of interest POI-n is reaching into a foot well, a storage compartment or a glove box in the cabin C; the person of interest POI-n is fastening their seat belt or adjusting a seat position; the person of interest POI-n is using a cellular telephone, a mobile device or a personal computer. The sets of activity data may comprise global data which is applied to each area of interest A-n in the vehicle V. Alternatively, the sets of activity data may be specific for particular areas of interest A-n in the vehicle V. For example, different sets of activity data may be defined for different areas of interest A-n in the vehicle V. For example, a first set of activity data may be associated with the person of interest POI-n seated in the driver seat SF-1; and a second set of activity data may be associated with the person of interest POI-n seated in the passenger seat SF-2. Thus, the controller 13 may differentiate between activities performed by the driver and a passenger in the vehicle V.

Figure 6:
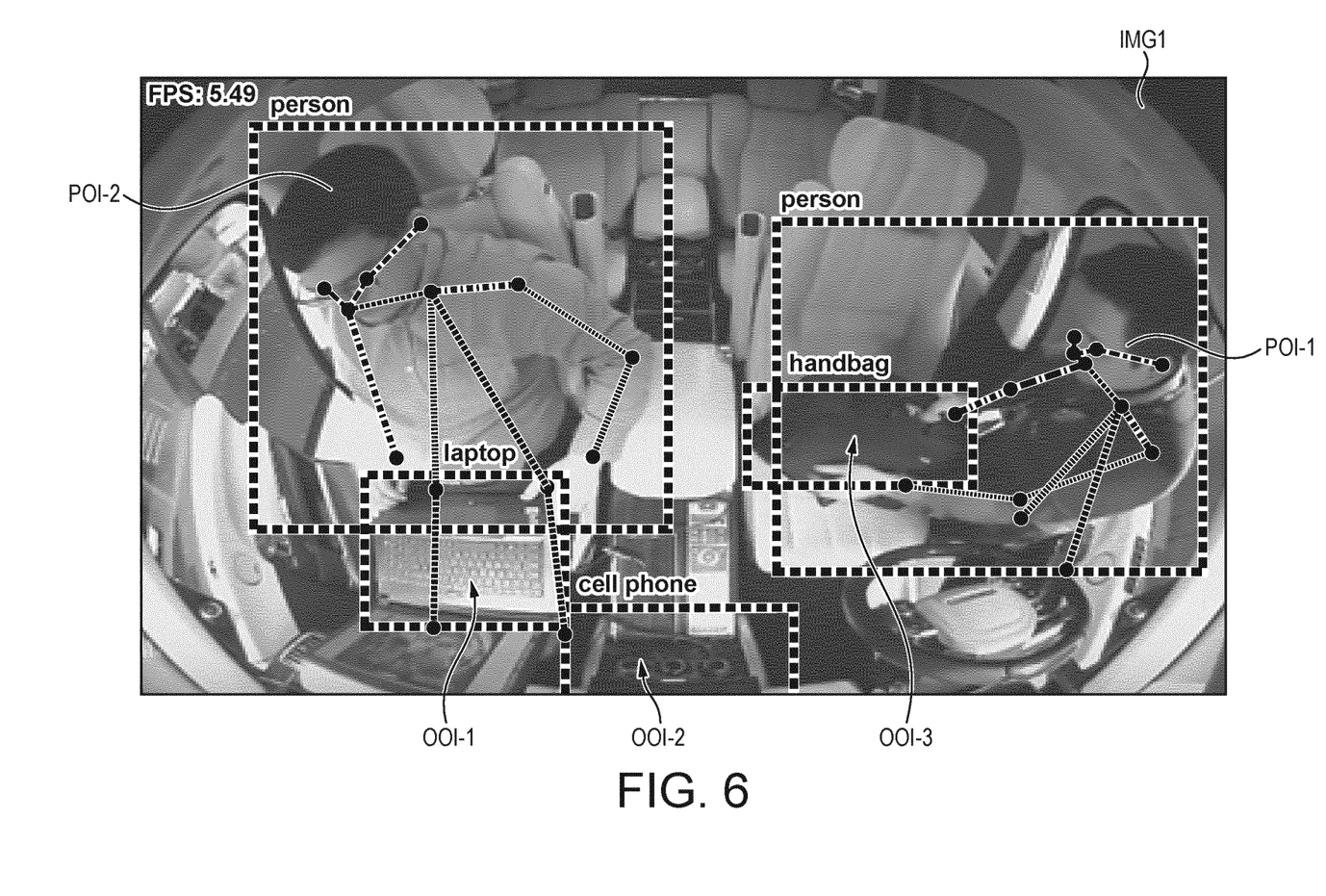
FIG. 6 shows a first image captured by the first imaging device with objects of interest overlaid.

In addition to implementing body landmark recognition algorithm, the controller 13 is configured to implement an object detection algorithm to identify and classify one or more object of interest OOI-n. A variant of the first image DIMG1 is shown in FIG. 6 by way of example. A first object of interest OOI-1 may comprise a laptop personal computer; a second object of interest OOI-2 may comprise a cellular telephone; and a third object of interest OOI-3 may comprise a handbag or laptop bag. The activity identification system 1 may use the object of interest OOI-n in identifying the activity being performed by the person of interest POI. For example, the activity identification system 1 may identify a particular activity comprising an interaction between the person of interest POI-n and the object of interest OOI-n. The object detection algorithm is operative to identify one or more objects of interest OOI-n in each frame of the first image data DIMG1 captured by the first imaging device C1. The object detection algorithm may, for example, process the first image data DIMG1 and/or the second image data DIMG2 to identify one or more objects occurring in the images captured by the first imaging device C1. An object may, for example, be identified using an edge detection algorithm to identify an outer edge of the object. The object detection algorithm may compare a current image IMG1, IMG2 of the cabin C (extracted from the first image data DIMG1 and/or the second image data DIMG2) with a reference image to identify variations which may be an object of interest OOI-n. Other techniques may be used to identify an object, for example to identify surface contours or profiles.

The identified image objects may then be compared with a plurality of predefined sets of object data. Each set of object data defines one or more identifying characteristics or properties of a particular type of object or a particular class of object. The object data may, for example, define at least one of the following set: one or more dimensions of the object; an aspect ratio of the object; a profile or shape of at least a portion of the object; and a surface contour of the object. The sets of object data may define a plurality of different types of object. The sets of object data may, for example, define one or more of the following types of object: a beverage container (such as a cup, a tin, a bottle, or a flask), a cellular telephone, a mobile device, a storage case or container (such as a hand bag or a brief case), a laptop computer, a food item (such as a sandwich or an item of confectionary), etc. The sets of object data may define other types of object.

The object detection algorithm determines a similarity between the extracted image object and the predefined object data. If the determined similarity is greater than a threshold, the image object is identified as being that type of object. The object detection algorithm may track changes in the location and/or orientation of the or each object identified in the first image data DIMG1 and/or the second image data DIMG2, for example to track movement of the identified object(s) within multiple frames. In the present embodiment, each identified object is classed as an object of interest OOI-n. A variety of object detection algorithms are available for commercial applications. A suitable object detection algorithm is the YOLO algorithm. An object bounding box is generated in respect of each object of interest OOI-n identified by the object detection algorithm.

The controller 13 utilises one or more of the skeletal pose data, the skeletal movement data and the object data to identify the activity being performed by the person of interest POI-n. The controller 13 may, for example, combine the skeletal pose data and the object data to identify the current activity being performed by the person of interest POI-n. By detecting an interaction with an object of interest OOI-n, the activity identification system 1 may identify the activity being performed by the person of interest POI-n with an increased accuracy. The activity identification system 1 generates the electrical output(s) 24 comprising an output activity identification signal S1 to identify the activity, for example to indicate that the person of interest POI-n is eating, sleeping etc.

One or more vehicle systems VS-n may be controlled in dependence on the electrical output 24 generated by the activity identification system 1. For example, the activity identification system 1 may be configured to control one or more vehicle safety systems VS-n. The vehicle safety systems VS-n may, for example, generate a notification if the activity identification system 1 determines that the driver of the vehicle V is performing a particular activity. The notification may be specific to the particular activity being performed by the person of interest POI-n. A plurality of notifications may be predefined. Each of the plurality of predefined notifications may be associated with a respective one of the plurality of different activities. By way of example, the activity may comprise manipulating a cellular (mobile) telephone and the notification may comprise a reminder of local legislative requirements, for example to recommend coupling the cellular telephone with onboard systems. The notification may comprise one or more of the following: an audio alert, a haptic alert and a visual alert. The notification may, for example, be output by an infotainment system provided in the vehicle V.

Figure 7:
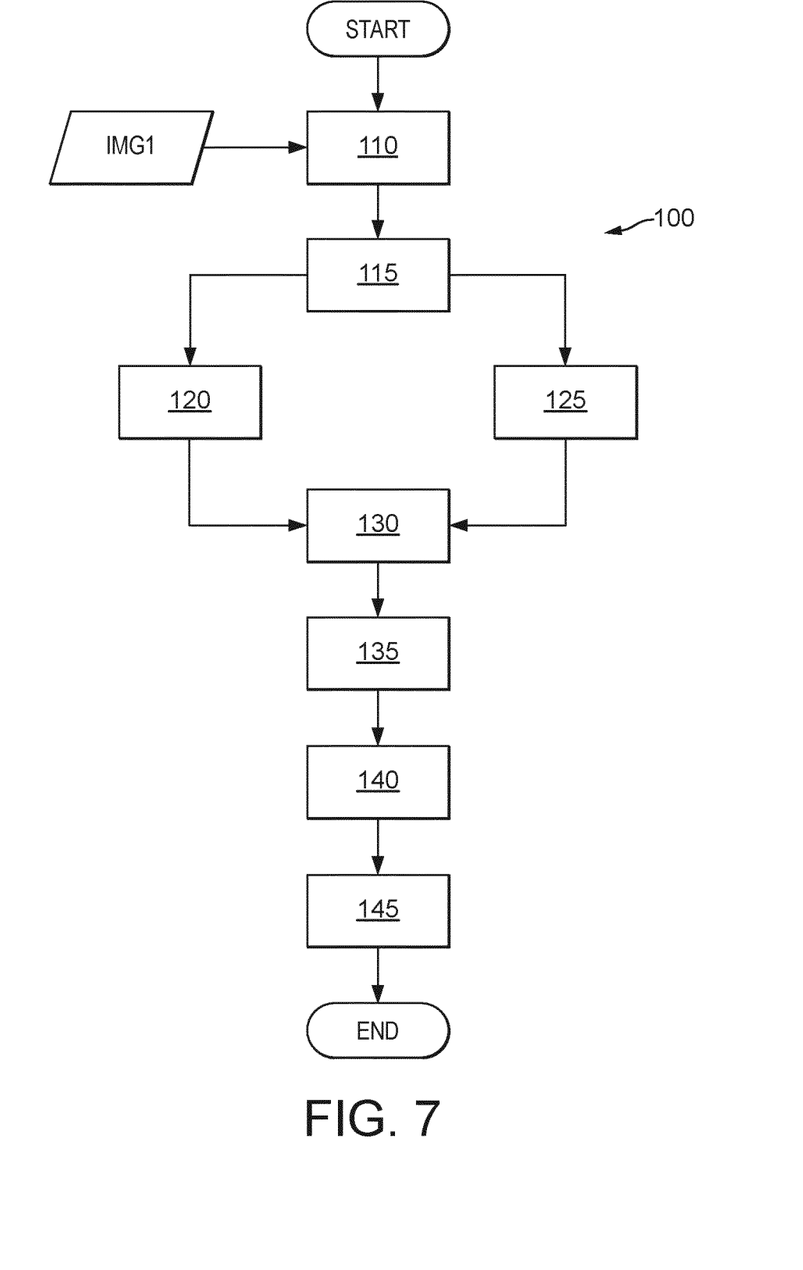
FIG. 7 shows a first flow chart representing operation of the activity identification system in accordance with the present embodiment.

The operation of the controller 13 to identify an activity being performed by a person of interest POI-n in an area of interest A-n will now be described with reference to a first flow diagram 100 shown in FIG. 7. The controller 13 performs the following operations:

1) Implement the body landmark recognition algorithm to identify body landmarks LM-n and generate the skeletal model 15 (BLOCK 110); and crop the raw pixels from the first image data DIMG1 and/or the second image data DIMG2 in the area of interest A-n (BLOCK 115);
2) Compute the optical flow between the current image frame and one or more previous image frames, including:
   a) Identify all raw pixel correspondences and store motion vectors (direction and magnitude) (BLOCK 120). This quantity allows the neural network to learn that most motion occurs around the centre part of the area of interest A-n. Larger motion magnitude may be present along the pixels spanning the arms of the person of interest POI-n. This component also allows for some feature redundancy if other algorithms miss detection.

b) Find all body landmark LM-n correspondences, store motion vectors (direction and magnitude) (BLOCK 125).

3) Establish a three dimensional (3D) volumetric space in dependence on the optical flows (BLOCK 130); and input the 3D volumetric space into a discriminative learning classifier (BLOCK 135).

4) Activity identification (i.e. inference) (BLOCK 140).

5) Output activity identification signal S1 (BLOCK 145).

When computing optical flow, a potential problem is pixel ambiguity which may arise due to a lack of textural information (or repetitive structure/texture). On a small (i.e. fine) scale, the individual pixel correspondences can be identified to reduce or avoid pixel ambiguity; this is known as a bottom-up analysis technique. Alternatively, correspondences may be determined in respect of image elements (or structures) composed of a plurality of pixels; this is known as a top-down analysis technique. The image elements may take the form of one or more of the following: an object, an object part, a salient area of texture (in the case of classes of amorphous special extent) and so on. Subsequently the optical flow is propagated across all the pixels that constitute such image elements. The motion may be encoded as optical flow between a plurality of consecutive frames or fixed regions of interest. The raw pixel correspondences (i.e. dense optical flow) may be used to encode motion between two consecutive frames, comprising a first image frame t-1 (i.e. a previous frame) and a second image frame t (i.e. current frame). The optical flow is assigned to the current image frame, thereby creating two additional images (i.e. 2D arrays). The magnitude of the optical flow is stored in one image and the direction angle is stored in the second image. The magnitude and direction values may be calculated using either of the aforementioned bottom-up and top-down analysis techniques. Not all pixels will have a correspondence as some pixels will simply disappear from the next frame, and a default value can be assigned for those lonely (transient) pixels. The images representing the magnitude and direction components of the optical flow can be concatenated into an image with two channels (width×height×2). A plurality of these images can be concatenated (depending on how many raw image frames are to be used to compute the optical flow), resulting in a volumetric space suitable for machine learning.

The classifier may comprise a neural network, for example a hybrid convolutional network comprising a long short term memory (LSTM) neural network. The method may also include identifying all object bounding boxes representing objects of interest OOI-n identified in the first image data DIMG1 and/or the second image data DIMG2. The method may comprise determining and storing motion vectors (direction and magnitude) in respect of each object bounding box. In an LSTM neural network, there are typically a plurality of LSTM cells. If the body of the network (i.e. the part that does the pixel encoding into higher level features such as edges, motifs, corners) is a convolutional neural network (CNN), there are typically a plurality of related convolution(al) filters. Considering an edge detection layer by way of example, a first convolution filter may be configured to detect horizontal edges, a second convolution filter may be configured to detect vertical edges and so on. It will be understood, therefore, that a plurality of convolutional filters act as salient feature extractors. Upon inspecting the output of certain convolution filters (otherwise known as filter response), intuitions may be developed that are similar to classical signal processing and computer vision techniques. For example, the convolution filters may be configured to act as respective low-pass filters, high-pass filters, band-pass filters, etc. so as effectively to remove redundant information. Once the redundant information is removed from each frame, the LSTM neural network can handle temporal information. The temporal information may be considered as any transition between states. For example, the temporal information may comprise one or more of the following: a change of position of a body joint, a change of pixel intensity value, a change of position of edges, a motif, a change of position of an object, etc.

Figure 8:
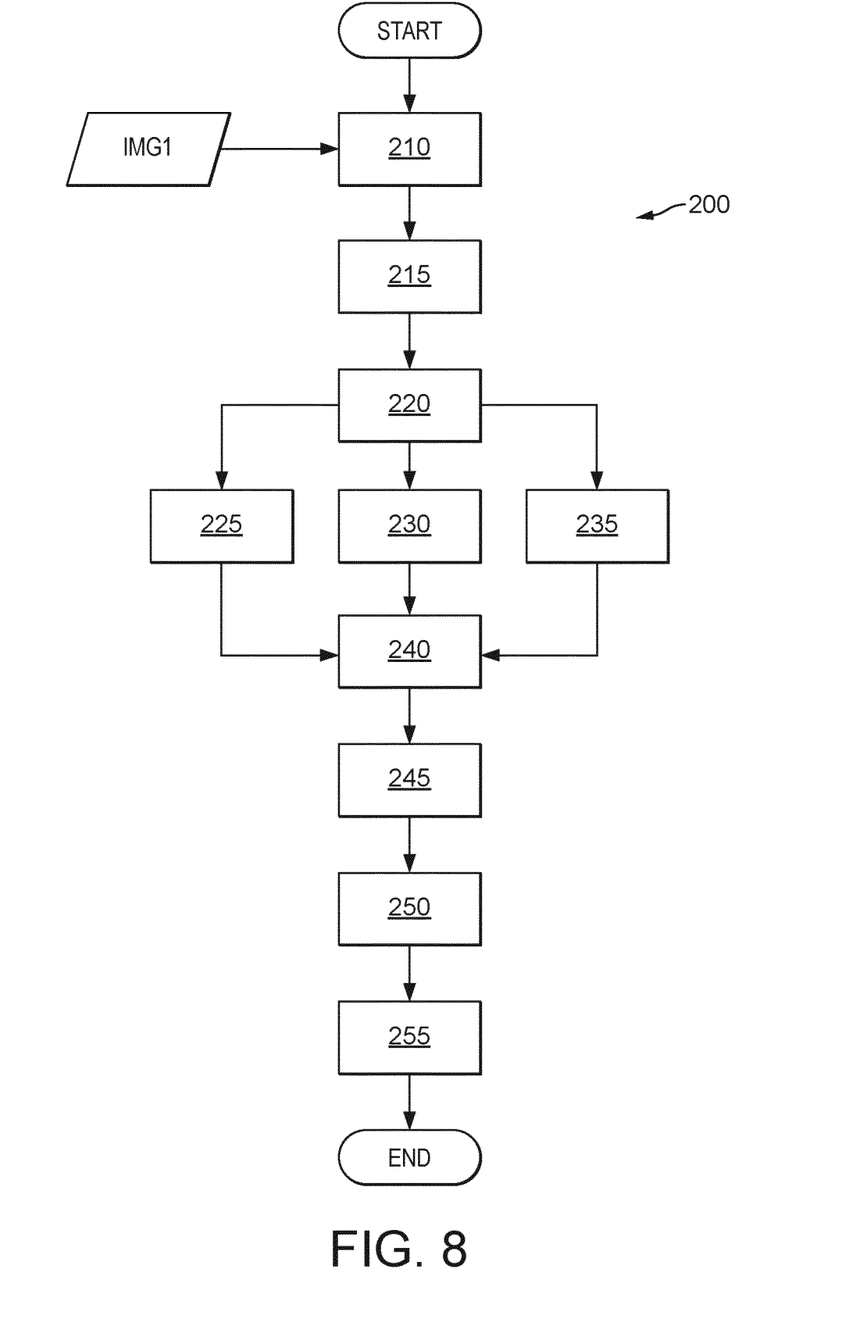
FIG. 8 shows a second flow chart representing operation of the activity identification system in accordance with the present embodiment.

The operation of the activity identification system 1 to identify an activity in dependence on an interaction between the person of interest POI-n and an object of interest OOI-n will now be described with reference to the second flow diagram shown in FIG. 8. In this example, the activity being performed by the person of interest POI-n is eating a food item, such as a sandwich. The controller 13 performs the following operations:

1) Implement the body landmark recognition algorithm to identify body landmarks LM-n (BLOCK 210); and implement the object detection algorithm to detect an object of interest OOI-n and apply an object bounding box to the object of interest OOI-n (BLOCK 215); and crop the raw pixels from the first image data DIMG1 and/or the second image data DIMG2 in the area of interest A-n (BLOCK 220);

2) Compute the optical flow between the current image frame and one or more previous image frames, including:

a) Identify all raw pixel correspondences and store motion vectors (direction and magnitude) (BLOCK 225). This quantity allows the neural network to learn that most motion only occurs around the centre part of the area of interest A-n. Larger motion magnitude may be present along the pixels spanning the arms of the person of interest POI-n. This component may also allow for some feature redundancy if other algorithms miss detection.

b) Find all body landmark correspondences, store motion vectors (direction and magnitude) (BLOCK 230). This quantity allows the neural network to learn that the activity comprises one or more identifiable actions. In the present example, the activity of "eating" consists of a circular wrist motion as the person of interest POI-n brings their hand into close proximity of their mouth.

c) Find all object bounding boxes correspondences, store motion vectors (direction and magnitude) (BLOCK 235). This quantity allows the neural network to learn that the activity comprises a particular object movement pattern associated with the "eating" consists of a moving food object that exhibits very similar motion to the wrist motion.

3) Establish a 3D volumetric space creation (BLOCK 240); and input the 3D volumetric space creation into a discriminative learning classifier to extract feature associated with each activity (BLOCK 245); and 4) Activity prediction i.e. inference (BLOCK 250).

5) Output activity identification signal S1 (BLOCK 255).

The vehicle V may optionally comprise an autonomous control system 50 for controlling dynamic operation of the vehicle V. The autonomous control system 50 may, for example, control one or more of the following: a steering angle; a torque request; and a braking request. The autonomous control system 50 may be capable of full-autonomous or partial-autonomous operation of the vehicle V. The autonomous control system 50 may require that a human driver monitors the driving environment (corresponding to an SAE International Automation Level 0, 1, 2); or that the control systems monitor the driving environment (corresponding to an SAE International Level 3, 4, 5). Thus, the driver may be required to control the vehicle V only under certain operating conditions. The autonomous control system 50 may be selectively activated and deactivated in dependence on the electrical output(s) 24 generated by the activity identification system 1. In this operating scenario, the person of interest POI-n monitored by the activity identification system 1 is the driver of the vehicle V.

The activity identification system 1 may selectively activate and deactivate the autonomous control system 50. The activity identification system 1 may control the autonomous control system 50 in dependence on the identified activity being performed by the driver of the vehicle V. Alternatively, or in addition, the activity identification system 1 may control the autonomous control system 50 in dependence on an elapsed time for performance of an activity by the driver of the vehicle V. A time threshold may be defined in respect of each activity. The controller 13 can deactivate the autonomous control system 50 upon determining that the activity has been performed for a period of time greater than or equal to the time threshold defined in respect of the identified activity. Different time thresholds may be defined for different activities. By determining how long the driver has been performing the identified activity, the activity identification system 1 can determine if there is sufficient time to hand over control to the driver.

By identifying the activity that the driver is performing, the activity identification system 1 can assess the attention of the driver to the road. The controller 13 may optionally generate an attentiveness indicator in dependence on the identified activity. The attentiveness indicator may provide an indication of attentiveness of the driver in relation to controlling dynamic operation of the vehicle V. The attentiveness indicator may, for example, indicate a low attentiveness if the activity identification system 1 determines that the driver is performing an activity other than controlling the vehicle V. Vehicle systems VS-n may be controlled in dependence on the attentiveness indicator. For example, an adaptive cruise control system may be controlled to increase or decrease a separation distance between the vehicle V and another vehicle in dependence on the attentiveness indicator.

It will be appreciated that various changes and modifications can be made to the present invention without departing from the scope of the present application. A timer may optionally be provided to determine a period of time that the person of interest has been engaged in a particular activity.

The invention claimed is:

1. A control system for identifying at least a first activity performed by a person of interest, the control system comprising a controller having a processor and a system memory, the controller being configured to:
   receive image data from at least one imaging device, the image data comprising at least one image frame representing an image scene including at least a portion of a person of interest;
   analyse the image data to generate a skeletal model output that indicates a skeletal model of the at least a portion of the person of interest;
   analyse the image data using predefined object data to generate an object detection output that indicates object image boundaries of at least one object of interest with which the person of interest is interacting;
   identify the first activity, from a predefined plurality of different activities, performed by the person of interest in dependence on output generated by a trained classifier that takes an input generated based on the skeletal model output and the object detection output; and
   control one or more vehicle systems in dependence on the identified first activity.

2. A control system as claimed in claim 1, wherein the controller is configured to identify movement of at least a portion of the skeletal model; and/or to identify movement of the identified object of interest.

3. A control system as claimed in claim 2, wherein the controller is configured to identify the first activity by identifying a predetermined first movement pattern of the skeletal model and/or the identified object of interest.

4. A control system as claimed in claim 2, wherein the image data comprises a plurality of image frames; the controller being configured to identify the skeletal model and/or the at least one object of interest in each of the plurality of image frames and to identify movement of the skeletal model and/or the at least one object of interest across the plurality of image frames.

5. A control system as claimed in claim 2, wherein the skeletal model comprises at least one skeletal element; and the controller is configured to generate a motion vector in respect of the or each skeletal element in order to identify the movement of the skeletal model.

6. A control system as claimed in claim 1, wherein the controller is configured to determine an attentiveness indicator in dependence on the movement of at least a portion of the skeletal model, the attentiveness indicator providing an indication of the attentiveness of the person of interest when performing the first activity.

7. A control system as claimed in claim 1, wherein the controller is configured to identify a plurality of body landmarks in each image frame and to use the body landmarks to identify the skeletal model.

8. A vehicle comprising the control system of claim 1.

9. A method of identifying at least a first activity performed by a person of interest, the method comprising:
   receiving image data comprising at least one image frame representing an image scene including at least a portion of a person of interest;
   analysing the image data to generate a skeletal model output that indicates a skeletal model of the at least a portion of the person of interest;
   analysing the image data using predefined object data to generate an object detection output that indicates object image boundaries of at least one object of interest with which the person of interest is interacting;
   identifying the first activity, from a predefined plurality of different activities, performed by the person of interest in dependence on output generated by a trained classifier that takes an input generated based on the skeletal model output and the object detection output; and
   controlling one or more vehicle systems in dependence on the identified first activity.

10. A method as claimed in claim 9, comprising identifying movement of at least a portion of the skeletal model; and/or identifying movement of the identified object of interest.

11. A method as claimed in claim 10, comprising identifying the first activity by identifying a predetermined first movement pattern of the skeletal model and/or the at least one object of interest.

12. A method as claimed in claim 10, wherein the image data comprises a plurality of image frames; the method comprising identifying the skeletal model and/or the at least one object of interest in each of the plurality of image frames and identifying movement of the skeletal model and/or the at least one object of interest across the plurality of image frames.

13. A method as claimed in claim 10, wherein the skeletal model comprises at least one skeletal element; and the method comprises monitoring movement of the or each skeletal element in order to identify the movement of the skeletal model.

14. A method as claimed in claim 9, wherein the method comprises determining an attentiveness indicator in dependence on the movement of at least a portion of the skeletal model, the attentiveness indicator providing an indication of the attentiveness of the person of interest when performing the first activity.

15. A method as claimed in claim 9, wherein the method comprises identifying a plurality of body landmarks in each image frame and using the body landmarks to identify the skeletal model.

16. A non-transitory, computer-readable storage medium storing instructions thereon that, when executed by one or more electronic processors, causes the one or more electronic processors to carry out the method claimed in claim 9.

17. A control system as claimed in claim 1, wherein the control system is configured to:
define a plurality of areas of interest within the image data, each area of interest comprising a discrete region which does not overlap with any other area of interest;
generate a subset of the image data for each area of interest; and
analyse each subset of the image data to identify the skeletal model of the at least a portion of the person of interest and identify the at least one object of interest with which the person of interest is interacting.

18. A method as claimed in claim 9, wherein the comprises:
defining a plurality of areas of interest within the image data, each area of interest comprising a discrete region which does not overlap with any other area of interest;
generating a subset of the image data for each area of interest; and
analysing each subset of the image data to identify the skeletal model of the at least a portion of the person of interest and identify the at least one object of interest with which the person of interest is interacting.

19. A control system as claimed in claim 1, wherein the predefined plurality of different activities includes at least three different activities.

20. A control system as claimed in claim 1, wherein the first activity is identified as an activity of a first activity type, and wherein the predefined plurality of different activities includes the first activity of the first activity type and a second activity of a second activity type that is different than the first activity type.

* * * * *